US012689322B2

(12) United States Patent
Chen et al.

(10) Patent No.: US 12,689,322 B2
(45) Date of Patent: Jul. 21, 2026

(54) AQUAVOLTAIC SYSTEM AND AQUAVOLTAIC METHOD APPLIED TO THE SAME

(71) Applicant: China Agricultural University, Beijing (CN)

(72) Inventors: Xiaomeng Chen, Beijing (CN); Yang Wang, Beijing (CN); Feiyu Zhu, Beijing (CN); Daoliang Li, Beijing (CN)

(73) Assignee: China Agricultural University, Beijing (CN)

( * ) Notice: Subject to any disclaimer, the term of this patent is extended or adjusted under 35 U.S.C. 154(b) by 0 days.

(21) Appl. No.: 19/020,662

(22) Filed: Jan. 14, 2025

(65) Prior Publication Data

US 2025/0233546 A1 Jul. 17, 2025

(30) Foreign Application Priority Data

Jan. 15, 2024 (CN) .......................... 202410056618.3

(51) Int. Cl.
*A01K 63/04* (2006.01)
*A01K 63/06* (2006.01)
(Continued)

(52) U.S. Cl.
CPC ............. *H02S 20/23* (2014.12); *A01K 63/045* (2013.01); *A01K 63/065* (2013.01); *H02J 7/35* (2013.01); *H02J 7/865* (2026.01); *H02S 10/20* (2014.12)

(58) Field of Classification Search
CPC .......... H02S 20/23; H02S 10/20; H02S 40/34; H02S 40/38; A01K 63/045; A01K 63/065; A01K 63/04; A01K 63/003; H02J 7/0068; H02J 7/35; Y02E 10/56; Y02P 90/50; C02F 1/444; C02F 1/586; G01N 33/18

(Continued)

(56) References Cited

U.S. PATENT DOCUMENTS 5,527,453 A * 6/1996 Hachima ................... C02F 3/10
210/150
2011/0273130 A1* 11/2011 Lee ......................... H02S 40/32
320/101

FOREIGN PATENT DOCUMENTS

CN 205547026 U * 9/2016
CN 214229476 U * 9/2021
(Continued)

*Primary Examiner* — Elim Ortiz
(74) *Attorney, Agent, or Firm* — TROUTMAN PEPPER LOCKE LLP; Christopher C. Close, Jr.

(57) ABSTRACT

An aquavoltaic system and an aquavoltaic method applied to the aquavoltaic system are provided. The aquavoltaic system comprises a fish pool, a photovoltaic power generation assembly, and a power storage assembly; a power-consuming device comprises a detection unit, a water quality regulating unit and a power regulator that are arranged in the fish pool; and an electric energy output end of the photovoltaic power generation assembly is connected to an electric energy input end of the power-consuming device via a first circuit, the electric energy output end of the photovoltaic power generation assembly is connected to an electric energy input end of the power storage assembly via a third circuit, the electric energy input end of the power-consuming device is connected to an electric energy output end of the power storage assembly via a fifth circuit, and a fifth switch is arranged on the third circuit.

7 Claims, 2 Drawing Sheets

(51) Int. Cl.

| | | |
|---|---|---|
| *H02J 7/00* | (2026.01) | |
| *H02J 7/35* | (2006.01) | |
| *H02S 10/20* | (2014.01) | |
| *H02S 20/23* | (2014.01) | |

(58) Field of Classification Search
USPC ..................................... 210/170.02; 119/215
See application file for complete search history.

(56) References Cited

FOREIGN PATENT DOCUMENTS

| CN | 116589145 A | * | 8/2023 | ................ C02F 9/00 |
|---|---|---|---|---|
| CN | 117898243 A | * | 4/2024 | ........... A01K 63/065 |

* cited by examiner

AQUAVOLTAIC SYSTEM AND AQUAVOLTAIC METHOD APPLIED TO THE SAME

CROSS REFERENCE TO RELATED APPLICATION

The patent application claims the benefit and priority of Chinese Patent Application No. 2024100566183, filed with the China National Intellectual Property Administration on Jan. 15, 2024, the disclosure of which is incorporated by reference herein in its entirety as part of the present application.

TECHNICAL FIELD

The present disclosure relates to the technical field of advanced environmental protection, and in particular to an aquavoltaic system and an aquavoltaic method applied to the aquavoltaic system.

BACKGROUND

In one aspect, as a highly intensive agriculture mode, factory aquaculture system has a problem of high operation energy consumption which is industry recognized. In the other aspect, unstable photovoltaic power makes it difficult to directly use photovoltaic green power to maintain stable operation of aquaclture facilities.

Therefore, how to improve stability of photovoltaic green power in factory aquaculture system has become a technical problem urgently to be solved by those skilled in the art.

SUMMARY

An objective of the present disclosure intends to provide an aquavoltaic system and an aquavoltaic method applied to the system, in order to solve the above problems existing in the prior art so as to improve stability of photovoltaic green power applied to factory aquaculture system.

To achieve the above object, the present disclosure provides the following solutions.

The present disclosure provides an aquavoltaic system, which includes a fish pool, a photovoltaic power generation assembly for supplying power to a power-consuming device in the fish pool, and a power storage assembly for receiving and storing excessive electric energy from the photovoltaic power generation assembly; the power-consuming device includes at least a detection unit that is arranged in the fish pool to detect a water quality parameter of the fish pool, a water quality regulating unit for regulating the water quality in the fish pool, and a power regulator for regulating the power of the water quality regulating unit; and an electric energy output end of the photovoltaic power generation assembly is connected to an electric energy input end of the power-consuming device via a first circuit, the electric energy output end of the photovoltaic power generation assembly is connected to an electric energy input end of the power storage assembly via a third circuit, the electric energy input end of the power-consuming device is connected to an electric energy output end of the power storage assembly via a fifth circuit, the third circuit is provided with a third switch for controlling on and off of the third circuit, and the fifth circuit is provided with a fifth switch for controlling on and off of the fifth circuit.

In one embodiment, the electric energy output end of the photovoltaic power generation assembly is connected to an electric energy input end of an external power grid via a second circuit, and the electric energy input end of the power-consuming device is connected to an electric energy output end of the external power grid via a fourth circuit; and the second circuit is provided with a second switch for controlling on and off of the second circuit, and the fourth circuit is provided with a fourth switch for controlling on and off of the fourth circuit.

In one embodiment, the detection unit includes a temperature sensor for detecting a temperature of a water body in the fish pool, a dissolved oxygen sensor for detecting an oxygen content in the fish pool, a turbidity sensor for detecting turbidity of the water body in the fish pool, and a pH detector for detecting a pH value in the fish pool.

In one embodiment, the water quality regulating unit includes an electric heating element for regulating the temperature of the water body in the fish pool, a variable-frequency water pump for regulating a circulation rate of the water body in the fish pool, a microfiltration tank for purifying water output from the fish pool, and an acid-base regulating tank for regulating the pH value in the fish pool; and the power regulator includes a first power regulator for regulating the heating power of the electric heating element and a second power regulator for regulating the power of the variable-frequency water pump.

In one embodiment, a water inlet of the fish pool is connected to a water outlet of an ammonia-nitrogen treatment tank, a water outlet of the fish pool is connected to a water inlet of the microfiltration tank, and a water outlet of the microfiltration tank is connected to a water inlet of the ammonia-nitrogen treatment tank; and the variable-frequency water pump is arranged between the water inlet of the fish pool and the water outlet of the ammonia-nitrogen treatment tank.

In one embodiment, the electric heating element is located in an interlayer of the fish pool, the interlayer is filled with a phase change material that is capable of absorbing heat when the temperature of the water body in the fish pool is higher than a phase change temperature, and releasing the heat when the temperature of the water body in the fish pool is lower than the phase change temperature.

In one embodiment, a maximum power point tracking (MPPT) controller for regulating the output power of the photovoltaic power generation assembly is arranged at the electric energy output end of the photovoltaic power generation assembly; a DC/DC inverter is arranged on the first circuit, and the DC/DC inverter is capable of converting a direct current generated by the photovoltaic power generation assembly into a direct current with a voltage required by the fish pool; and a DC/AC inverter is arranged on the second circuit, and the DC/AC inverter is capable of converting an alternating current generated by the photovoltaic power generation assembly into an alternating current required by the external power grid.

In one embodiment, the system further includes a control device, where the control device controls the power regulator to start the water quality regulating unit or to increase the power of the water quality regulating unit when the water quality parameter of the fish pool needs to be regulated; and the control device controls the power regulator to turn off the water quality regulating unit or to keep the water quality regulating unit in a current state when the water quality regulation parameter in the fish pool does not need to be regulated.

The present disclosure further provides an aquavoltaic method applied to an aquavoltaic system described above.

When the amount of power consumed by the power-consuming device is not greater than the amount of power generated by the photovoltaic power generation assembly:

if the power storage assembly has a remaining capacity, the power-consuming device is supplied with power by using the first circuit, and the power storage assembly is charged by using the third circuit;

if the power storage assembly is in a full state, the power-consuming device is supplied with power by using the first circuit, and the third circuit is switched off; and when the amount of power consumed by the power-consuming device is greater than the amount of power generated by the photovoltaic power generation assembly:

if a sum of the amount of power generated by the photovoltaic power generation assembly and the amount of power stored by the power storage assembly is not less than the amount of power consumed by the power-consuming device, the power-consuming device is supplied with power by using the first circuit and the fifth circuit;

if the sum of the amount of power generated by the photovoltaic power generation assembly and the amount of power stored by the power storage assembly is less than the amount of power consumed by the power-consuming device, the power supply to the power-consuming device is stopped.

The present disclosure further provides an aquavoltaic method applied to the aquavoltaic system described above. When the amount of power consumed by the power-consuming device is not greater than the amount of power generated by the photovoltaic power generation assembly:

if the power storage assembly has a remaining capacity, the power-consuming device is supplied with power by using the first circuit, and the power storage assembly is charged by using the third circuit, and after the power storage assembly is full, remaining power is transmitted to the external power grid by using the second circuit;

if the power storage assembly is in a full state, the power-consuming device is supplied with power by using the first circuit, and the remaining power is transmitted to the external power grid by using the second circuit; and when the amount of power consumed by the power-consuming device is greater than the amount of power generated by the photovoltaic power generation assembly:

if the sum of the amount of power generated by the photovoltaic power generation assembly and the amount of power stored by the power storage assembly is not less than the amount of power consumed by the power-consuming device, the power-consuming device is supplied with power by using the first circuit and the fifth circuit;

if the sum of the amount of power generated by the photovoltaic power generation assembly and the amount of power stored by the power storage assembly is less than the amount of power consumed by the power-consuming device, the power-consuming device is supplied with power by using at least one of the first circuit and the fifth circuit, and the fourth circuit jointly or the power-consuming device is supplied with power separately by using the fourth circuit.

Compared with the prior art, the present disclosure has the following technical effects.

The present disclosure adopts the photovoltaic power generation assembly to provide the electric energy required for operation of the fish pool, reduces the power consumption of the fish pool during operation, stores photovoltaic green power, which cannot be consumed by the fish pool, by the power storage assembly, and supplies the electric energy to the fish pool when the electric energy generated by the photovoltaic power generation assembly is not enough to meet operation requirement of the fish pool, so as to improve stability of the photovoltaic green power applied to aquaclture.

BRIEF DESCRIPTION OF THE DRAWINGS

To illustrate the technical solutions in embodiments of the present disclosure or conventional art more clearly, the accompanying drawings required for the embodiments will be briefly described below. Apparently, the accompanying drawings in the following description show merely some embodiments of the present disclosure, and those of ordinary skill in the art may still derive other accompanying drawings from these accompanying drawings without creative efforts.

In the figures: 1. Fish pool; 2. Photovoltaic power generation assembly; 3. DC/DC inverter; 4. MPPT controller; 5. DC/AC inverter; 6. Charging and discharging controller; 7. Power storage assembly; 8. Microfiltration tank; 9. Variable-frequency water pump; 10. Ammonia-nitrogen treatment tank; 11. Dissolved oxygen sensor; 12. Temperature sensor; 13. Circulating pump; 14. Flow meter; 15. Aeration device; 16. Electric heating element; 17. Controller; 18. First circuit; 19. Second circuit; 20. Second switch; 21. First switch; 22. Third circuit; 23. Fourth circuit; 24. Fifth circuit.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the embodiments described are merely some rather than all of the embodiments of the present disclosure. On the basis of the examples in the present disclosure, all the other examples that would have been obtained by those of ordinary skill in the art without any inventive effort shall fall within the scope of protection of the present disclosure.

To make the above objective, features and advantages of the present disclosure clearer and more comprehensible, the present disclosure is further described in detail below with reference to the accompanying drawings and specific implementations.

Figure 1:
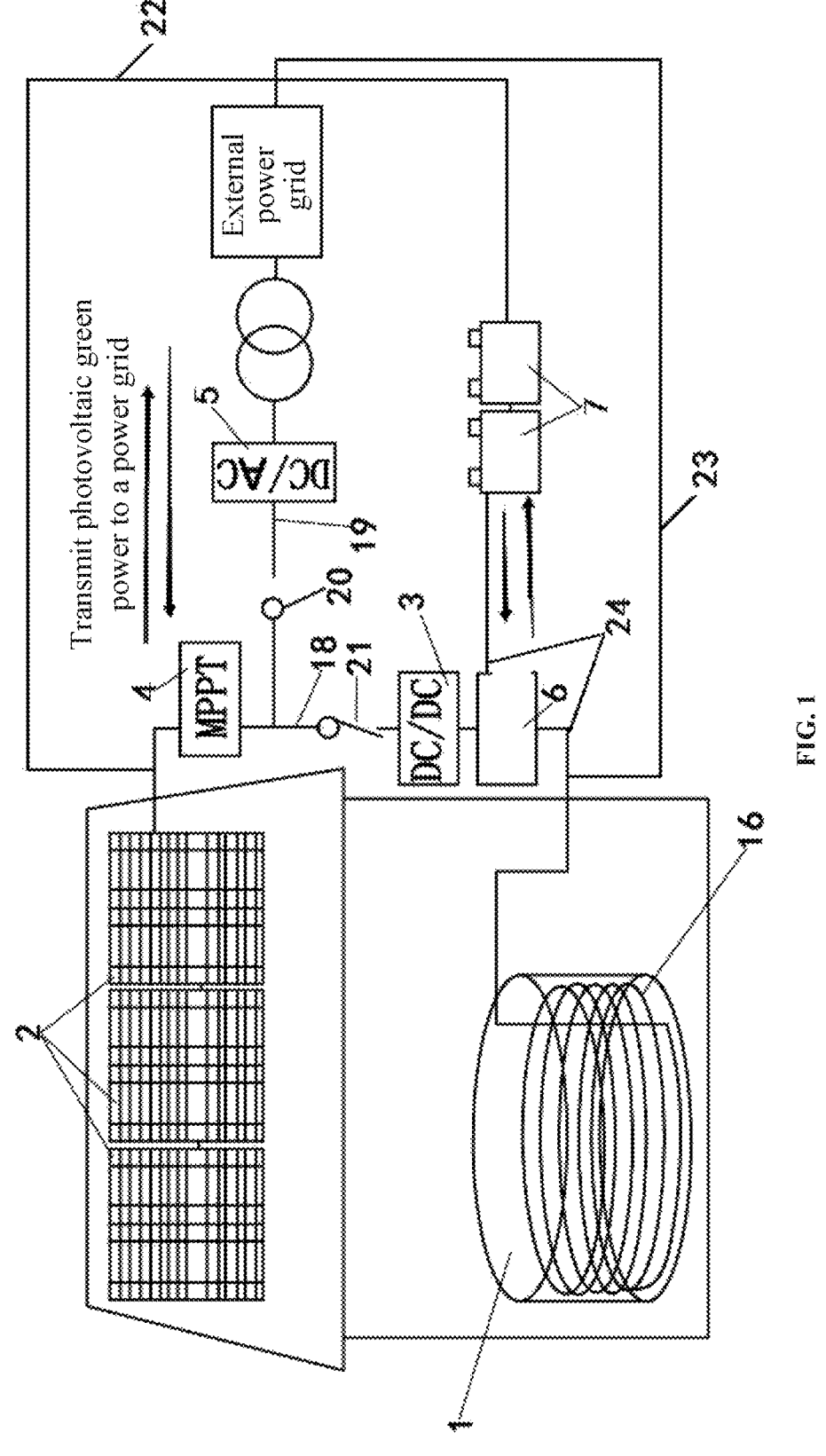
FIG. 1 is a schematic structural diagram showing a fish pool and a photovoltaic power generation assembly.
Figure 2:
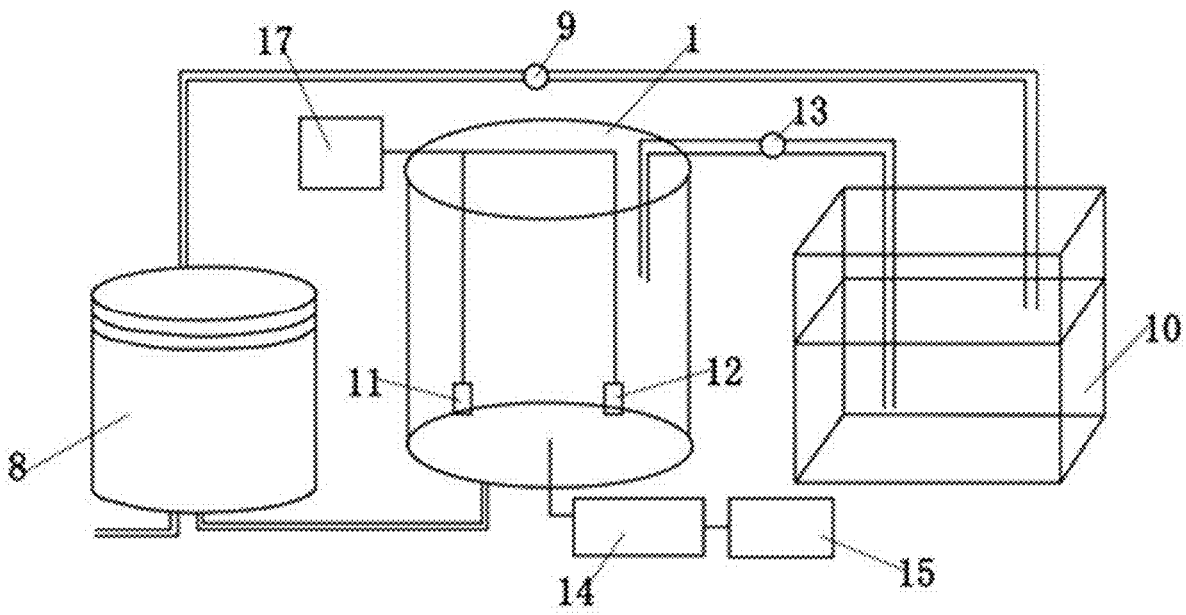
FIG. 2 is a schematic structural diagram showing a fish pool, an ammonia-nitrogen treatment tank and a microfiltration tank.

As shown in FIGS. 1 and 2, the present disclosure discloses an aquavoltaic system, which includes a fish pool 1, a photovoltaic power generation assembly 2 for supplying power to a power-consuming device in the fish pool 1, and a power storage assembly 7 (e.g., the power storage assembly 7 may be specifically a structure capable of storing electric energy, such as a storage battery) for receiving and storing excessive electric energy from the photovoltaic power generation assembly 2. The power-consuming device includes at least a detection unit that is arranged in the fish pool 1 for detecting a water quality parameter of the fish pool 1, a water quality regulating unit for regulating the water quality in the fish pool 1, and a power regulator for regulating the power of the water quality regulating unit.

An electric energy output end of the photovoltaic power generation assembly 2 is connected to an electric energy input end of the power-consuming device via a first circuit 18, the electric energy output end of the photovoltaic power generation assembly 2 is connected to an electric energy input end of the power storage assembly 7 via a third circuit 22, the electric energy input end of the power-consuming device is connected to an electric energy output end of the power storage assembly 7 via a fifth circuit 24, the third circuit 22 is provided with a third switch for controlling on and off of the third circuit 22, and the fifth circuit 24 is provided with a fifth switch for controlling on and off of the fifth circuit 24.

When the power-consuming device in the fish pool 1 needs power, the first switch 21 is closed, and the first circuit 18 is switched on to supply electric energy generated by the photovoltaic power generation assembly 2 to the fish pool 1, such that the electricity required for the operation of the power-consuming device in the fish pool 1 comes from the electric energy generated by the photovoltaic power generation assembly 2, thereby achieving green power utilization (i.e. the green power utilization means using regenerative electric energy that is photovoltaically generated without any pollutants generated in the power generation process thereof); meanwhile, in the present disclosure, whether the fish pool 1 needs water quality regulation or not is determined by a controller 17 or an operator according to a reading feedback of the detection unit and a set value of the water quality parameter of the fish pool 1 (i.e, the set value of the water quality parameter of the fish pool 1 refers to a value or a value range of a parameter suitable for the survival of aquatic organisms in the fish pool 1). If it is found that the water quality parameter of the fish pool 1 is within the set value range of the water quality parameter of the fish pool 1, the shutdown of the power regulator and the water quality regulating unit is kept; if it is found that the water quality parameter of the fish pool 1 exceeds or is less than the set value, the operator or the controller 17 closes the first switch 21, switches on the first circuit 18 so as to supply the electric energy generated by the photovoltaic power generation assembly 2 to the fish pool 1, and turns on the water quality regulating unit by the power regulator to regulate the water quality of the fish pool 1; after the water quality parameter of the fish pool 1 is regulated to be within the set value range, the operator or the controller 17 switches on the third switch and switches off the first switch 21 so as to store the electric energy in the power storage assembly 7, which is generated by the photovoltaic power generation assembly 2 and not consumed by the fish pool 1. If there is still remaining electric energy generated by the photovoltaic power generation assembly 2 after the power storage assembly 7 is full of the electric energy, the operator or the controller 17 switches on the second switch 20 and switches off the third switch so as to transmit the remaining electric energy to an external power grid; and when the amount of power consumed by the power-consuming device in the fish pool 1 is greater than the amount of the electric energy generated by the photovoltaic power generation assembly 2, but less than a sum of the electric energy generated by the photovoltaic power generation assembly 2 and the electric energy stored by the power storage assembly 7, the operator or the controller 17 switches on the first switch 21 and the fifth switch, and the photovoltaic power generation assembly 2 and the power storage assembly 7 jointly supply power to the power-consuming device in the fish pool 1 (for ease and brevity of description, "the power-consuming device in the fish pool 1" will be referred to as "the power-consuming device" for short).

In the present disclosure, the electric energy from the photovoltaic power generation assembly 2 that is consumed by the fish pool 1 within a unit time, is decreased by intermittently regulating the water quality parameter of the fish pool 1, and the electric energy which is not consumed by the fish pool 1, is stored in the power storage assembly 7 and supplied to the fish pool 1 when the photovoltaic power generation assembly 2 generates less electric energy, so that the fish pool 1 can be supplied with the electric energy and operates stably either during a period when the photovoltaic power generation assembly 2 generates more electric energy or during a period when the photovoltaic power generation assembly 2 generates less electric energy. That is, the present disclosure improves the stability of photovoltaic green power applied to the operation of the fish pool 1, and makes the fish pool 1 consume environmentally friendly electric energy, thereby reducing carbon emissions caused by the power-consuming operation of the fish pool 1. In addition, when the controller 17 is required to control the actions of the first switch 21, the third switch, the fifth switch and the water quality regulating unit, it is required to electrically connect the third switch, the fifth switch, the water quality regulating unit and the detection unit to the controller 17. As shown in FIG. 1, in the present disclosure, a charging and discharging controller 6 is arranged between the electric energy output end of the power storage assembly 7 and the electric energy input end of the power-consuming device in the fish pool, and the charging and discharging controller 6 controls the power storage assembly 7 to supply the electric energy to the power-consuming device.

Further, in the present disclosure, the electric energy output end of the photovoltaic power generation assembly 2 is connected to an electric energy input end of the external power grid via a second circuit 19, and the electric energy input end of the power-consuming device is connected to an electric energy output end of the external power grid via a fourth circuit 23; and the second circuit 19 is provided with the second switch 20 for controlling on and off of the second circuit 19, and the fourth switch is provided with a fourth switch for controlling on and off of the fourth circuit 23.

When the photovoltaic power generation assembly 2 generates more power that is enough to meet the demand of the power-consuming device, and if there is still remaining electric energy after the power storage assembly 7 is full, the fourth switch is switched on to transmit the remaining electric energy to the external power grid to earn green power subsidies; moreover, when the photovoltaic power generation assembly 2 generates less power that is not enough for the operation of the fish pool 1 after the fish pool 1 has consumed the electric energy generated by the photovoltaic power generation assembly 2 and the electric energy generated by the power storage assembly 7, the fourth switch is switched on to supply the electric energy from the external power grid to the power-consuming device, in order to ensure the stable operation of the fish pool 1 (i.e, the stable operation of the fish pool 1 means that the water quality parameter of the fish pool 1 is almost always maintained within the set range by intermittently regulating the water quality parameter of the fish pool 1 using the detection assembly).

Furthermore, the detection unit in the present disclosure includes a temperature sensor 12 for detecting a temperature of a water body in the fish pool 1, a dissolved oxygen sensor 11 for detecting an oxygen content in the fish pool 1, a turbidity sensor for detecting turbidity of the water body in the fish pool 1, and a pH detector for detecting a pH value in the fish pool 1. The water quality regulating unit includes an electric heating element 16 for regulating the temperature of the water body in the fish pool 1, a variable-frequency water pump 9 for regulating a circulation rate of the water body in the fish pool 1, a microfiltration tank for purifying water output from the fish pool 1, and an acid-base regulating tank for regulating the pH value in the fish pool 1; and the power regulator includes a first power regulator for regulating a heating power of the electric heating element 16 and a second power regulator for regulating a power of the variable-frequency water pump 9. Moreover, the present disclosure further includes an aeration device 15 connected to the fish pool 1, a third power regulator for regulating aeration power of the aeration device 15, and an acid/alkali regulating water pump for regulating an output rate of an acid/alkali regulating liquid, and a fourth power regulator for regulating the acid/alkali regulating pump, where the acid/alkali water pump is arranged between the acid-base regulating tank and the fish pool 1 and is configured to deliver an acid/alkali regulating liquid into the fish pool 1. A flow meter 14 is arranged between the aeration device 15 and the fish pool 1. It should also be noted that if the controller 17 controls action of the water quality regulating unit mentioned above in the present disclosure, and it is required to electrically connect all of the water quality regulating unit, the detection unit and the power regulator to the controller 17 in order to ensure the smooth implementation of the above functions of the controller 17; alternatively, the controller 17 may also not be arranged, the operator manually adjusts the water quality regulating unit according to a reading of the detection unit to implement the above functions.

It should be noted that the detection unit in the present disclosure may further include a sensor capable of detecting other types of water quality parameters of the fish pool 1, and the water quality regulating unit may further include a structure capable of regulating other types of water quality parameters of the fish pool 1.

As shown in FIG. 2, in the present disclosure, a water inlet of the fish pool 1 is connected to a water outlet of the ammonia-nitrogen treatment tank 10, a water outlet of the fish pool 1 is connected to a water inlet of the microfiltration tank, and a water outlet of the microfiltration tank is connected to a water inlet of the ammonia-nitrogen treatment tank 10; and the variable-frequency water pump 9 is arranged between the water inlet of the fish pool 1 and the water outlet of the ammonia-nitrogen treatment tank 10. After the fish pool 1 runs for a period of time, output water is discharged into the microfiltration tank 8 and is preliminarily purified and filtered by the microfiltration tank 8, water output from the microfiltration tank 8 then enters the ammonia-nitrogen treatment tank 10, the ammonia-nitrogen treatment tank 10 treats organic matter and other contaminants in the output water, and the treated water is discharged to the fish pool 1 by the circulating pump 13, thereby achieving the circulating treatment of the water body in the fish pool 1. When the controller 17 or the operator detects by the turbidity sensor that turbidity of the water body in the fish pool 1 exceeds a set value, the variable-frequency water pump 9 is started to speed up water circulation treatment in the fish pool 1 so as to renew the water body in the fish pool 1.

Furthermore, in the present disclosure, the electric heating element 16 is located in an interlayer of the fish pool 1, the interlayer is filled with a phase change material that is capable of absorbing heat when the temperature of the water body in the fish pool 1 is higher than a phase change temperature, and releasing heat when the temperature of the water body in the fish pool 1 is lower than the phase change temperature. In this way, the heat released by the phase change material shortens operation time of the electric heating element 16 and reduces operation costs of the fish pool 1. The phase change material has a phase change temperature that is the same as or similar to a set temperature in the fish pool 1 (i.e, the set temperature is a temperature suitable for survival of the aquatic organisms in the fish pool 1). With regard to the phase change material, reference may be made to an agricultural low-temperature phase change heat storage material having a phase change temperature of 15.1~34° C. described in a patent document CN105733517A of an agricultural low-temperature phase change heat storage material and a preparation method thereof.

As shown in FIG. 1, a maximum power point tracking (MPPT) controller 174 for regulating output power of the photovoltaic power generation assembly 2 is arranged at the electric energy output end of the photovoltaic power generation assembly 2 in the present disclosure; a DC/DC inverter 3 is arranged on the first circuit 18, and the DC/DC inverter 3 is capable of converting a direct current generated by the photovoltaic power generation assembly 2 into a direct current of a voltage required by the fish pool 1; and a DC/AC inverter 5 is arranged on the second circuit 19, and the DC/AC inverter 5 is capable of converting an alternating current generated by the photovoltaic power generation assembly 2 into an alternating current required by the external power grid.

Furthermore, the aquavoltaic system of the present disclosure further includes a control device (the controller 17 is the controller 17 mentioned above), where the control device controls the power regulator to start the water quality regulating unit or to increase the power of the water quality regulating unit when the water quality parameter of the fish pool 1 needs to be regulated; and the control device controls the power regulator to turn off the water quality regulating unit or to keep the water quality regulating unit in a current state when the water quality regulation parameter in the fish pool 1 does not need to be regulated.

As shown in FIG. 2, the fish pool 1 of the present disclosure is a circular fish pool 1, the water inlet of the fish pool 1 is located on one side of the fish pool 1, and the water outlet of the fish pool 1 is located on the other side of the fish pool 1. By configuring the fish pool 1 as the circular fish pool 1, a "dead zone" in the fish pool 1 during water circulation is reduced, thus ensuring the cleanliness of the water body in the fish pool 1. The flow of the water body in the fish pool 1 is promoted by respectively arranging the water inlet and the water outlet on two sides of the fish pool 1, such that the water body in the fish pool 1 can undergo cyclical purification treatment, thereby further ensuring cleanliness of the water body in the fish pool 1.

The present disclosure further provides an aquavoltaic method applied to the aquavoltaic system described above, when the amount of power consumed by the power-consuming device is not greater than the amount of power generated by the photovoltaic power generation assembly 2, if the power storage assembly 7 has a remaining capacity, the power-consuming device is supplied with power by using the first circuit 18, and the power storage assembly 7 is charged by using the third circuit 22; and this way ensures stable operation of the power-consuming device in the fish pool 1, such that the water quality parameter of the fish pool 1 can be almost always maintained within the set range, meanwhile the electric energy that is generated by the photovoltaic power generation assembly 2 and cannot be consumed by the power-consuming device is stored in the power storage assembly 7, and when the photovoltaic power generation assembly 2 generates less electric energy, the power storage assembly 7 releases the electric energy for use of the power-consuming device.

When the amount of power consumed by the power-consuming device is not greater than the amount of power generated by the photovoltaic power generation assembly 2, and the power storage assembly 7 is in a full state, the power-consuming device is supplied with power by using the first circuit 18, and the third circuit 22 is switched off; at this time, the photovoltaic power generation assembly 2 generates the electric energy enough to meet the demand of the power-consuming device, and since the power storage assembly 7 is full, the photovoltaic power generation assembly 2 does not need to supply power to the power storage assembly 7.

When the amount of power consumed by the power-consuming device is greater than the amount of power generated by the photovoltaic power generation assembly 2, and the sum of the amount of power generated by the photovoltaic power generation assembly 2 and the amount of power stored by the power storage assembly 7 is not less than the amount of power consumed by the power-consuming device, the power-consuming device is supplied with power by using the first circuit 18 and the fifth circuit 24; and when the amount of power consumed by the power-consuming device is greater than the amount of power generated by the photovoltaic power generation assembly 2, and the sum of the amount of power generated by the photovoltaic power generation assembly 2 and the amount of power stored by the power storage assembly 7 is less than the amount of power consumed by the power-consuming device, power supply to the power-consuming device is stopped, so that both the photovoltaic power generation assembly 2 and the power storage assembly 7 have an electric energy margin, and the problem is prevented that the photovoltaic power generation assembly 2 and the power storage assembly 7 completely release the electric energy to cause the photovoltaic power generation assembly 2 and the power storage assembly 7 to be vulnerable to damage.

The present disclosure further provides another aquavoltaic method applied to the aquavoltaic system described above. When the amount of power consumed by the power-consuming device is not greater than the amount of power generated by the photovoltaic power generation assembly 2 and the power storage assembly 7 has a remaining capacity, the power-consuming device is supplied with power by using the first circuit 18, and the power storage assembly 7 is charged by using the third circuit 22, and after the power storage assembly 7 is full, the remaining power is transmitted to the external power grid by using the second circuit 19.

When the amount of power consumed by the power-consuming device is not greater than the amount of power generated by the photovoltaic power generation assembly 2, and the power storage assembly 7 is in a full state, the power-consuming device is supplied with power by using the first circuit 18, and the remaining power is transmitted to the external power grid by using the second circuit 19 to earn green power subsidies;

when the amount of power consumed by the power-consuming device is greater than the amount of power generated by the photovoltaic power generation assembly 2, and the sum of the amount of power generated by the photovoltaic power generation assembly 2 and the amount of power stored by the power storage assembly 7 is not less than the amount of power consumed by the power-consuming device, the power-consuming device is supplied with power by using the first circuit 18 and the fifth circuit 24; and when the amount of power consumed by the power-consuming device is greater than the amount of power generated by the photovoltaic power generation assembly 2, and the sum of the amount of power generated by the photovoltaic power generation assembly 2 and the amount of power stored by the power storage assembly 7 is less than the amount of power consumed by the power-consuming device, the power-consuming device is supplied with power by using at least one of the first circuit 18 and the fifth circuit 24, and the fourth circuit 23 jointly (i.e, the first circuit 18 and the fourth circuit 23 jointly supply power to the power-consuming device, or the fifth circuit 24 and the fourth circuit 23 jointly supply power to the power-consuming device), or the power-consuming device is supplied with power separately by using the fourth circuit 23.

In summary, aiming at solving the current two problems of high energy consumption of industrial aquaculture system and difficult in-situ consumption of photovoltaic green power, the present disclosure breaks a constant-temperature heat supply mode of a conventional fish pool 1, fully explores and utilizes flexible heat storage of the water body in the fish pool 1, creates a dynamic thermal environment suitable for fish growth while achieving flexible consumption of the photovoltaic green power, and promotes energy saving and emission reduction of aquaclture facilities.

In the present disclosure, the principle and implementations of the present disclosure are described herein by using specific examples, the above descriptions of the above embodiments are merely intended to help understand the methods and core idea of the present disclosure. In addition, for those of ordinary skill in the art, changes may be made to the specific embodiments and the scope of application according to the concept of the present disclosure. In summary, the content of the description should not be construed as a limitation to the present disclosure.

What is claimed is:

1. An aquavoltaic method applied to an aquavoltaic system, wherein the aquavoltaic system comprises: a fish pool; a photovoltaic power generation assembly, configured to supply power to a power-consuming device in the fish pool; and a power storage assembly, configured to receive and store excessive electric energy from the photovoltaic power generation assembly, wherein the power-consuming device comprises at least a detection unit that is arranged in the fish pool and configured to detect a water quality parameter of the fish pool, a water quality regulating unit configured to regulate water quality in the fish pool, and a power regulator configured to regulate a power of the water quality regulating unit; and an electric energy output end of the photovoltaic power generation assembly is connected to an electric energy input end of the power-consuming device via a first circuit, the electric energy output end of the photovoltaic power generation assembly is connected to an electric energy input end of the power storage assembly via a third circuit, the electric energy input end of the power-consuming device is connected to an electric energy output end of the power storage assembly via a fifth circuit, the third circuit is provided with a third switch configured to control on and off of the third circuit, and the fifth circuit is provided with a fifth switch configured to control on and off of the fifth circuit, the aquavoltaic method comprising:

when an amount of power consumed by the power-consuming device is not greater than an amount of power generated by the photovoltaic power generation assembly:

in a case that the power storage assembly has a remaining capacity, the power-consuming device is supplied with power by using the first circuit, and the power storage assembly is charged by using the third circuit;

in a case that the power storage assembly is in a full state, the power-consuming device is supplied with power by using the first circuit, and the third circuit is switched off; and when the amount of power consumed by the power-consuming device is greater than the amount of power generated by the photovoltaic power generation assembly:

in a case that a sum of the amount of power generated by the photovoltaic power generation assembly and an amount of power stored by the power storage assembly is not less than the amount of power consumed by the power-consuming device, the power-consuming device is supplied with power by using the first circuit and the fifth circuit;

in a case that the sum of the amount of power generated by the photovoltaic power generation assembly and the amount of power stored by the power storage assembly is less than the amount of power consumed by the power-consuming device, power supply to the power-consuming device is stopped.

2. The aquavoltaic method according to claim 1, wherein the detection unit comprises a temperature sensor configured to detect a temperature of a water body in the fish pool, a dissolved oxygen sensor configured to detect an oxygen content in the fish pool, a turbidity sensor configured to detect a turbidity of the water body in the fish pool, and a pH detector configured to detect a pH value in the fish pool.

3. The aquavoltaic method according to claim 1, wherein the water quality regulating unit comprises an electric heating element configured to regulate the temperature of the water body in the fish pool, a variable-frequency water pump configured to regulate a circulation rate of the water body in the fish pool, a microfiltration tank configured to purify water output from the fish pool, and an acid-base regulating tank configured to regulate the pH value in the fish pool; and the power regulator comprises a first power regulator configured to regulate a heating power of the electric heating element and a second power regulator configured to regulate a power of the variable-frequency water pump.

4. The aquavoltaic method according to claim 3, wherein a water inlet of the fish pool is connected to a water outlet of an ammonia-nitrogen treatment tank, a water outlet of the fish pool is connected to a water inlet of the microfiltration tank, and a water outlet of the microfiltration tank is connected to a water inlet of the ammonia-nitrogen treatment tank; and the variable-frequency water pump is arranged between the water inlet of the fish pool and the water outlet of the ammonia-nitrogen treatment tank.

5. The aquavoltaic method according to claim 3, wherein the electric heating element is located in an interlayer of the fish pool, the interlayer is filled with a phase change material that is capable of absorbing heat when a temperature of the water body in the fish pool is higher than a phase change temperature, and releasing the heat when a temperature of the water body in the fish pool is lower than the phase change temperature.

6. The aquavoltaic method according to claim 1, wherein the aquavoltaic system further comprises a control device, the control device is configured to control the power regulator to start the water quality regulating unit or to increase a power of the water quality regulating unit when the water quality parameter of the fish pool needs to be regulated; and the control device is configured to control the power regulator to turn off the water quality regulating unit or to keep the water quality regulating unit in a current state when the water quality parameter in the fish pool does not need to be regulated.

7. An aquavoltaic method applied to an aquavoltaic system, wherein the aquavoltaic system comprises: a fish pool; a photovoltaic power generation assembly, configured to supply power to a power-consuming device in the fish pool; and a power storage assembly, configured to receive and store excessive electric energy from the photovoltaic power generation assembly, wherein the power-consuming device comprises at least a detection unit that is arranged in the fish pool and configured to detect a water quality parameter of the fish pool, a water quality regulating unit configured to regulate water quality in the fish pool, and a power regulator configured to regulate a power of the water quality regulating unit; and an electric energy output end of the photovoltaic power generation assembly is connected to an electric energy input end of the power-consuming device via a first circuit, the electric energy output end of the photovoltaic power generation assembly is connected to an electric energy input end of the power storage assembly via a third circuit, the electric energy input end of the power-consuming device is connected to an electric energy output end of the power storage assembly via a fifth circuit, the third circuit is provided with a third switch configured to control on and off of the third circuit, and the fifth circuit is provided with a fifth switch configured to control on and off of the fifth circuit, the electric energy output end of the photovoltaic power generation assembly is connected to an electric energy input end of an external power grid via a second circuit, and the electric energy input end of the power-consuming device is connected to an electric energy output end of the external power grid via a fourth circuit; and the second circuit is provided with a second switch configured to control on and off of the second circuit, and the fourth circuit is provided with a fourth switch configured to control on and off of the fourth circuit, the aquavoltaic method comprising:

when an amount of power consumed by the power-consuming device is not greater than an amount of power generated by the photovoltaic power generation assembly:

in a case that the power storage assembly has a remaining capacity, the power-consuming device is supplied with power by using the first circuit, and the power storage assembly is charged by using the third circuit, and after the power storage assembly is full, remaining power is transmitted to the external power grid by using the second circuit;

in a case that the power storage assembly is in a full state, the power-consuming device is supplied with power by using the first circuit, and the remaining power is transmitted to the external power grid by using the second circuit; and when the amount of power consumed by the power-consuming device is greater than the amount of power generated by the photovoltaic power generation assembly:

in a case that a sum of the amount of power generated by the photovoltaic power generation assembly and an amount of power stored by the power storage assembly is not less than the amount of power consumed by the power-consuming device, the power-consuming device is supplied with power by using the first circuit and the fifth circuit;

in a case that the sum of the amount of power generated by the photovoltaic power generation assembly and the amount of power stored by the power storage assembly is less than the amount of power consumed by the power-consuming device, the power-consuming device is supplied with power by using at least one of the first circuit and the fifth circuit, and the fourth circuit jointly or the power-consuming device is supplied with power separately by using the fourth circuit.

\* \* \* \* \*